US012267305B2

(12) United States Patent
Barmpalios et al.

(10) Patent No.: US 12,267,305 B2
(45) Date of Patent: *Apr. 1, 2025

(54) PRIVACY PRESERVING DOCUMENT ANALYSIS

(71) Applicant: Adobe Inc., San Jose, CA (US)

(72) Inventors: Nikolaos Barmpalios, Sunnyvale, CA (US); Ruchi Rajiv Deshpande, Belmont, CA (US); Randy Lee Swineford, Sunnyvale, CA (US); Nargol Rezvani, Sunnyvale, CA (US); Andrew Marc Greene, Newton, MA (US); Shawn Alan Gaither, Raleigh, NC (US); Michael Kraley, Lexington, MA (US)

(73) Assignee: Adobe Inc., San Jose, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 18/317,338

(22) Filed: May 15, 2023

(65) Prior Publication Data

US 2023/0336532 A1 Oct. 19, 2023

Related U.S. Application Data

(63) Continuation of application No. 16/695,636, filed on Nov. 26, 2019, now Pat. No. 11,689,507.

(51) Int. Cl.
*H04L 9/40* (2022.01)
*G06N 5/04* (2023.01)
(Continued)

(52) U.S. Cl.
CPC .............. *H04L 63/04* (2013.01); *G06N 5/04* (2013.01); *G06N 20/00* (2019.01); *G06Q 30/0202* (2013.01)

(58) Field of Classification Search
CPC .......... H04L 63/04; G06N 5/04; G06N 20/00; G06Q 30/0202; G06V 30/40–43
See application file for complete search history.

(56) References Cited

U.S. PATENT DOCUMENTS

| 5,754,939 A | 5/1998 | Herz et al. |
| 9,129,227 B1 | 9/2015 | Yee et al. |

(Continued)

OTHER PUBLICATIONS

Heimerl, Florian, et al. "embcomp: Visual interactive comparison of vector embeddings." IEEE Transactions on Visualization and Computer Graphics 28.8 (2020): 2953-2969.*

(Continued)

*Primary Examiner* — Matthew T Henning
(74) *Attorney, Agent, or Firm* — FIG. 1 Patents

(57) ABSTRACT

Systems and techniques for privacy preserving document analysis are described that derive insights pertaining to a digital document without communication of the content of the digital document. To do so, the privacy preserving document analysis techniques described herein capture visual or contextual features of the digital document and creates a stamp representation that represents these features without included the content of the digital document. The stamp representation is projected into a stamp embedding space based on a stamp encoding model generated through machine learning techniques capturing feature patterns and interaction in the stamp representations. The stamp encoding model exploits these feature interactions to define similarity of source documents based on location within the stamp embedding space. Accordingly, the techniques described herein can determine a similarity of documents without having access to the documents themselves.

20 Claims, 13 Drawing Sheets

(51) Int. Cl.
  *G06N 20/00*         (2019.01)
  *G06Q 30/0202*       (2023.01)

(56) References Cited

U.S. PATENT DOCUMENTS

| | | | |
|---|---|---|---|
| 11,689,507 B2* | 6/2023 | Barmpalios | G06N 3/08 |
| | | | 726/26 |
| 2003/0220916 A1* | 11/2003 | Imaichi | G06F 16/34 |
| | | | 707/E17.093 |
| 2016/0379132 A1 | 12/2016 | Jin et al. | |
| 2017/0212650 A1 | 7/2017 | Sinyagin et al. | |
| 2019/0197482 A1 | 6/2019 | George et al. | |
| 2019/0286936 A1* | 9/2019 | Fuchs | G06F 18/2115 |

OTHER PUBLICATIONS

"Restriction Requirement", U.S. Appl. No. 16/695,636, Mar. 28, 2022, 6 pages.
U.S. Appl. No. 16/695,636, "Non-Final Office Action", U.S. Appl. No. 16/695,636, Aug. 3, 2022, 8 pages.
U.S. Appl. No. 16/695,636, "Notice of Allowance", U.S. Appl. No. 16/695,636, Feb. 15, 2023, 7 pages.

* cited by examiner

PRIVACY PRESERVING DOCUMENT ANALYSIS

RELATED APPLICATION

This application is a continuation of and claims priority to U.S. patent application Ser. No. 16/695,636, filed Nov. 26, 2019, entitled "Privacy Preserving Document Analysis," the entire disclosure of which is hereby incorporated by reference herein in its entirety.

BACKGROUND

Computers are used in many different aspects of our lives. One such use is the creation or consumption of digital content, such as news articles, scientific reports, product or service brochures, promotional materials, financial documents, and so forth. To consume digital content, a client device typically utilizes an application configured to view files of a particular format. For example, Adobe Acrobat Reader is configured to create or consume PDF documents.

Digital analytics systems have been developed to generate insights regarding user interaction with digital content. These insights may be leveraged for a variety of purposes, such as to control operation of computing devices, control output of digital content, and so forth. However, digital analytics systems are limited to information extracted from the user interaction or the digital content itself. While many forms of user interaction (e.g., interaction with web content) are monitored by a system hosting the content, conventional techniques used to generate insights fail where the user has an expectation of privacy, e.g., when the user is consuming private content in an offline manner.

Thus, current digital analytic systems lack a way to collect and extract information from documents where a user expects privacy without causing user dissatisfaction and frustration.

SUMMARY

Systems and techniques for privacy preserving document analysis are described that derive insights pertaining to a digital document without communication of the content of the digital document. These techniques overcome the limitations of conventional digital analytics systems which are limited to processes requiring access to the content itself and thus require a lack of a privacy with respect to a consumer of the digital document. To do so, the privacy preserving document analysis techniques described herein captures visual or contextual features of the digital document and creates a stamp representation that represents these features without including the content of the digital document. The stamp representation is projected into a stamp embedding space based on a stamp encoding model generated through machine learning techniques, which captures feature patterns and interaction that a human cannot detect. The stamp encoding model exploits these feature interactions of the stamp representations to define similarity of source documents based on location within the stamp embedding space. Accordingly, a digital analytics system using the techniques described herein can determine a similarity of documents without having access to the documents themselves, enabling a variety of functionality, such as adjustment of a corpus, retrieval of proxy documents, predictions pertaining to a consumer of digital documents, and so forth.

This summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
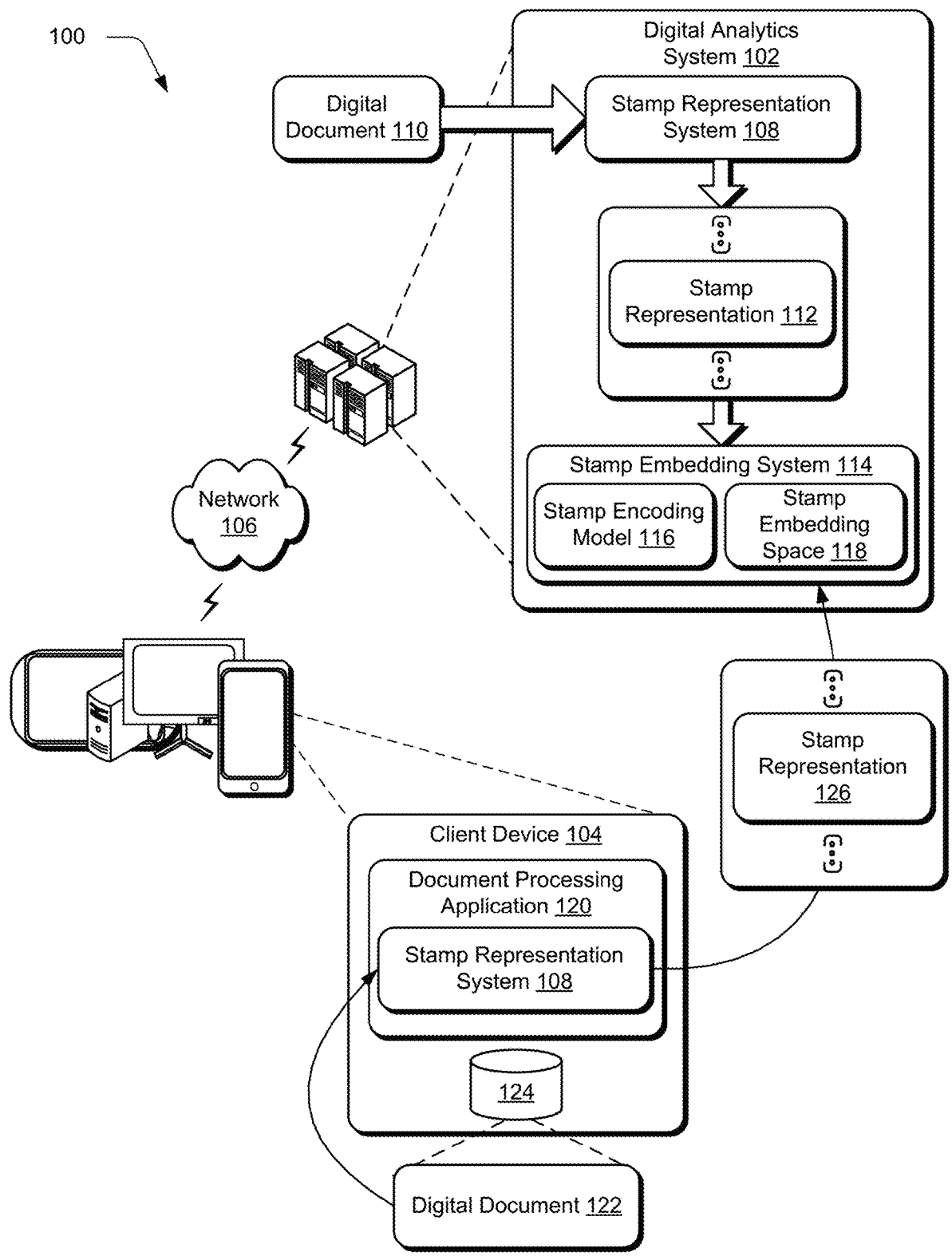
FIG. 1 is an illustration of an environment in an example implementation that is operable to employ privacy preserving document analysis techniques as described herein.

In conventional digital analytics systems, the content of a digital document is analyzed to generate insights into the digital document or a consumer of the digital document. These insights may be leveraged for a variety of purposes, such as to control operation of computing devices, control output of digital content, and so forth. These conventional systems, however, require direct access to the content of the digital document. In settings where the user has an expectation of privacy, e.g., when the user is consuming private content, conventional systems cannot generate insights without violating the consumer's privacy. This limits the accuracy and applicability of conventional digital analytics systems in areas where consumers generally have an expectation of privacy, e.g., when viewing PDF documents with a PDF viewing application such as Adobe Acrobat Reader.

Accordingly, techniques are described in which a digital analytic system derives insights pertaining to a digital document without access to the content of the digital document. To do so, the privacy preserving document analysis techniques described herein capture visual or contextual features of a digital document by utilizing a stamp representation system to create a stamp representation of the digital document. The stamp representation system parses data contained in the digital document and visualizes that data with representations that do not contain the content of the digital document. For example, visual features of the digital document (e.g., text features, lines, bounding boxes, images, tables, charts, and so forth) are represented by colored blocks or lines, such that each visual feature is represented at a location without containing the content of the respective visual feature. For instance, a paragraph of text in the digital document is represented in the stamp representation by a colored block that does not contain any text.

A stamp embedding system of the digital analytic system collects a plurality of stamp representations, such as from a document corpus. The stamp representations are processed with a machine learning module to create a stamp encoding model that is a deep learning architecture capable of capturing feature patterns and interactions that are not detectable by a human. The machine learning module, for instance, utilizes a loss function that maximizes the difference between stamp representations of different classes and minimizes the difference between stamp representations of a same class.

The stamp encoding model, once trained, processes an input stamp representation to create a stamp embedding within a stamp embedding space. The stamp embedding space includes a plurality of dimensions that represent features of source documents, such that stamp embeddings with similar features will occupy a similar space within the stamp embedding space. The digital analytics system processes the plurality of stamp representations with the stamp encoding model in order to populate the stamp embedding space with a plurality of stamp embeddings.

The digital analytics system receives an additional stamp representation, for which the digital analytics system does not have access to a corresponding source document. The digital analytics system projects the additional stamp representation into the stamp embedding space through use of the stamp encoding model. The digital analytics system analyzes the stamp embedding space to derive insights into a source document associated with the additional stamp representation. In this way, the digital analytics system generates insight into the source document without having access to the source document or the content of the source document.

These insights may be utilized in a number of ways. For example, the insights may be used to adjust the documents included in a document corpus, identify out-of-distribution documents, retrieve similar proxy documents for the additional stamp representation, determine a probability of retention of a customer, predict user satisfaction, determine expectations of a user, suggest tools for presentation in a user interface, disable functionality or alter a configuration of a document processing application, and so forth.

In this way, the privacy preserving document analysis techniques may be generalized to obtain insights into any digital document, including private digital documents, without infringing on the privacy expectations of consumers. This allows the digital analytics system to obtain insights for documents outside the reach of conventional digital analytic systems. As a result, functions depending on derived insights are provided with increased accuracy, improving operational efficiency of a computing device that employs these techniques. For example, classifying a document type to suggest tools for presentation in a user interface provides a more efficient user interface allowing the user to quickly access the suggested tools, reducing the amount of time the user expends in generating digital content because he or she need not manually search through various menus or functionality to find the suggested tools. Reducing the amount of time the user expends in generating digital content reduces device resource usage (e.g., power) by reducing the time spent operating the device. As another example, imbalanced or inaccurate data sets present problems for machine learning techniques. By using the privacy preserving document analysis techniques to adjust the documents included in a document corpus as discussed herein, the accuracy of a training technique and the efficiency of a system implementing the technique are increased, and may be leveraged to reduce inaccuracies and resource wastage experienced in conventional digital analytic systems.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Term Examples

Example descriptions or explanations of certain terms as used herein are set forth below. Each term is applicable to one or more, but not necessarily all, implementations that are presented herein. Some terms are further described using one or more examples.

A "digital document" refers to any electronic media content that includes a visible creation such as a design or an electronic file that embodies the visible creation. Examples of digital documents include word processing products, marketing materials such as digital pamphlets, book illustrations, presentations such as slide decks, web pages, content output via applications, combinations thereof, and so forth, and may be of any suitable format, such as a .pdf file, a .doc file, a .jpeg file, and so forth.

A "stamp representation" is a representation of a digital document that contains information derived from the digital document without containing the actual content of the digital document.

A "stamp embedding" is a representation of a stamp representation that characterizes features of the stamp representation in a plurality of numerical values. As the stamp representation itself is a representation of a digital document, the stamp embedding thus indirectly characterizes features of the digital document.

A "source document" of a stamp representation refers to the digital document for which the stamp representation represents. A "source document" of a stamp embedding refers to the source document of the stamp representation for which the stamp embedding represents. Thus, a single digital document may exist for both of a stamp representation and a stamp embedding.

"Machine learning" refers to a computer representation that can be tuned (e.g., trained) based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine learning model can include but is not limited to, decision trees, support vector machines, linear regression, logistic regression, Bayesian networks, random forest learning, dimensionality reduction algorithms, boosting algorithms, artificial neural networks, deep learning, and so forth. Thus, a machine learning model makes high-level abstractions in data by generating data-driven predictions or decisions from the known input data.

Example Environment

FIG. 1 is an illustration of a digital medium environment 100 in an example implementation that is operable to employ privacy preserving document analysis techniques in a digital analytics system as described herein. The illustrated environment 100 includes a digital analytics system 102 and a plurality of client devices, an example of which is illustrated as client device 104. These devices are communicatively coupled, one to another, via a network 106 (e.g., the Internet) and computing devices that implement these systems and devices may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as shown for the digital analytics system 102 and as further described in FIG. 13.

The digital analytics system 102 includes a stamp representation system 108 that is configured to analyze, manage, and expose a result of processing digital documents 110. The stamp representation system 108, for instance, is configured to identify meaningful features or patterns in a digital document 110 and use those features or patterns to create a stamp representation 112 corresponding the digital document 110. The stamp representation 112 contains information derived from the digital document 110, and describes aspects of the content of the digital document 110 without including the content of the digital document 110, as further described with respect to FIG. 2.

The digital analytics system 102 further includes a stamp embedding system 114 configured to process the stamp representations 112 to create a stamp encoding model 116. In order to create the stamp encoding model 114, for instance, the stamp embedding system 114 utilizes a machine-learning model using the stamp representations 112 as training data to extract features from the stamp representations, identify patterns that are not recognizable by a human, and represent these patterns in a stamp embedding space 118. For example, the stamp encoding model 116 may be trained as a classification model to project a stamp representation into the stamp embedding space 118. The machine learning model may be configured in a variety of ways, such as a neural network (e.g., a deep-learning neural network), statistical model (e.g., using linear regression), and so forth as further described with respect to FIG. 4.

The stamp encoding model 116 is configured to process a stamp representation and characterize features of a digital document (e.g., features of a digital document corresponding to the stamp representation) within the stamp embedding space 118 without having access to the digital document itself. In some implementations, an instance of the stamp representation system 108 is included as part of a document processing application 120 on the client device 104. The document processing application 120, for instance, is configured to support user interaction with a digital document 122, which may be stored in a storage device 124. When the document processing application 120 accesses the digital document 122 (e.g., to view or edit the digital document 122), the document processing application 120 processes the digital document 122 with the stamp representation system 108 to generate a stamp representation 126. While the stamp representation 126 contains information derived from the digital document 122 and describes aspects of the content of the digital document 122, the stamp representation 126 does not contain the content itself and cannot be reverse-engineered to obtain the content.

The stamp representation 126 is transmitted to the digital analytics system 102, e.g., via the network 106. The digital analytics system 102 processes the stamp representation 126 with the encoding model 116 to project the stamp representation 126 into the stamp embedding space 118. Based on the projection in the stamp embedding space 118, insights are derived pertaining to the digital document 122 without the digital analytics system 102 having access to the digital document 122. In this way, the digital analytics system 102 can gain insights into the types of digital documents utilized by consumers of the document processing application 120 while preserving the privacy of a user associated with the client device 104. Accordingly, a developer of the document processing application 120 can gain a better understanding of the types of digital documents that consumers open, which in turn allows the developer to improve and refine the functionality of the document processing application 120.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
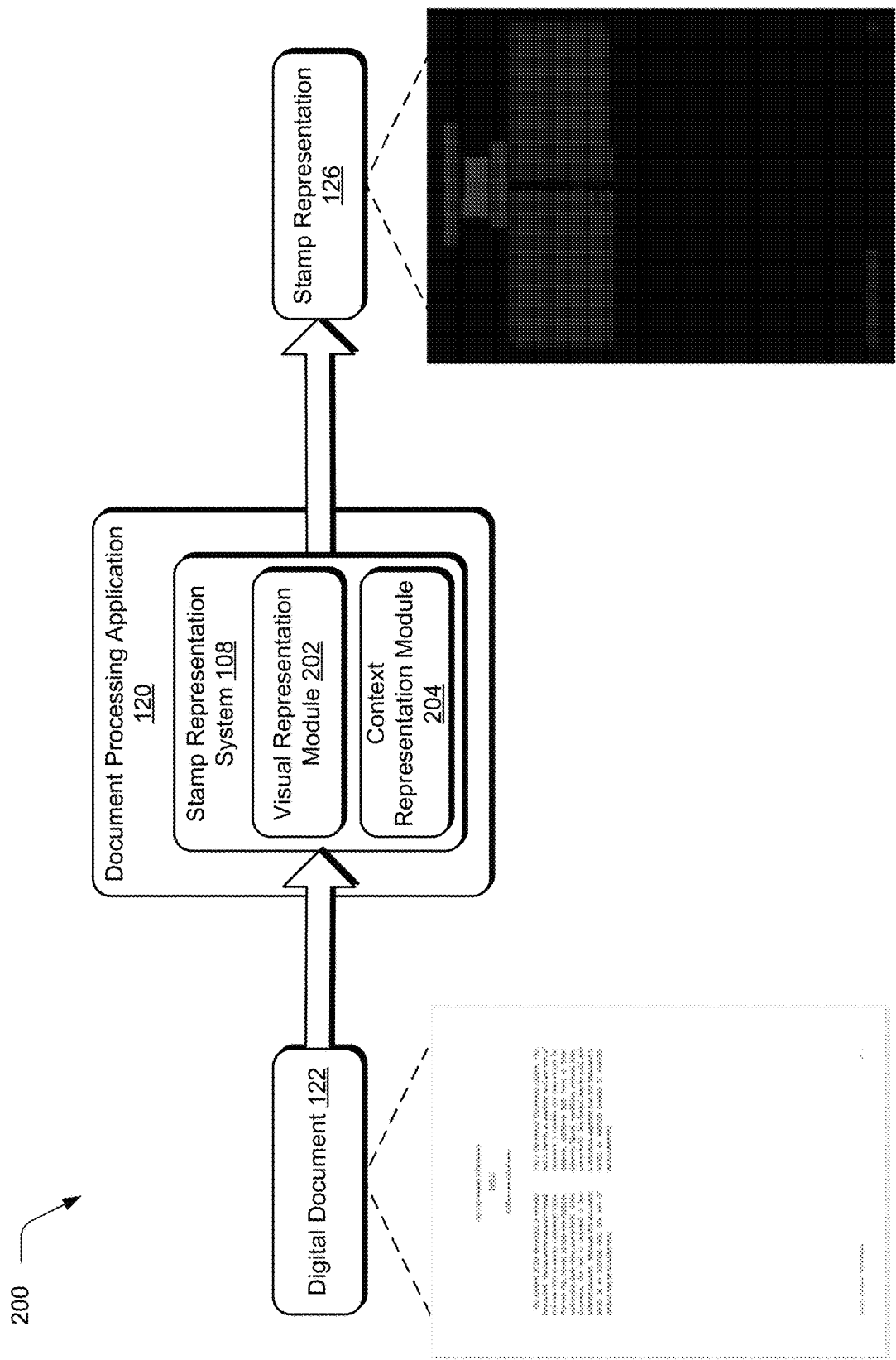
FIG. 2 depicts an example system showing a stamp representation processing pipeline of the digital analytics system of FIG. 1 in greater detail.

FIG. 2 depicts a system 200 showing an example stamp representation processing pipeline of the stamp representation system 108 of FIG. 1 in greater detail to create the stamp representation 126. In some implementations, the stamp representation module 108 employs a visual representation module 202 and/or a context representation module 204 to create the stamp representation 126.

The stamp representation processing pipeline begins with an input of the digital document 122. For instance, the document processing application 120 is executed to view the digital document 122, and in so doing provides the digital document as an input to the stamp representation module 108. The digital document 122 may take any number of forms, and is any electronic media content that refers to a visible creation such as a design or an electronic file that embodies the visible creation. Examples of digital documents include marketing materials such as digital pamphlets, book illustrations, presentations such as slide decks, web pages, word processing products, content output via applications, combinations thereof, and so forth, and may be of any suitable format, such as a .pdf file, a .doc file, a .jpeg file, and so forth.

The visual representation module 202 processes the digital document 122 to generate a privacy preserving representation of visual features of the digital document 122 for use in generation of the stamp representation 126. The visual representation module 202 analyzes the digital document 122 to identify and extract visual features in the digital document 122 (e.g., by parsing the data contained in a pdf file and visualizing that data), such as text features, bounding boxes, images, formulas, tables, charts, graphs, headers, footers, and so forth. The visual representation module 202 may extract features with varying levels of granularity. As an example, text features of the digital document 122 may be identified according to font type, font size, font color, font weight, typographical emphasis (e.g., text that is bolded, italicized, underlined, capitalized, includes strikethrough), and so forth. In another implementation the visual representation module 202 merely identifies that text features are present without further analysis.

The stamp representation module 108 utilizes the visual features identified by the visual representation module 202 to create the stamp representation 126. In implementations, the stamp representation 126 corresponds to a visual size or aspect ratio of the digital document 122. The identified visual features are represented in the stamp representation 126 in a manner that conveys a structure of the digital document 122 without including the content of the digital document 122. In some implementations, the visual features of the digital document 122 are represented as colored regions in the stamp representation 126. For instance, text features of the digital document 122 are represented by colored blocks in the stamp representation 126, each block having a location in the stamp representation 126 corresponding to the location of the associated text feature in the digital document 122. Visual features of the digital document 122 may be represented in the stamp representation 126 in a manner that distinguishes different visual features from one another, for instance with different colors that each indicate a respective type of visual feature. For example, text features may be represented by blue blocks, tables may be represented with red lines, images may be represented with orange blocks, and so forth. The colors, for instance, may additionally or alternatively indicate whether a visual feature is based on text, raster, or vector data, and so forth.

The stamp representation system 108 may further incorporate stylistic information such as typographical emphasis features into the stamp representation 126 by altering the representation of a particular feature. For example, a text feature with a 12-point "Times New Roman" font may be represented with a blue color, a text feature with a 14-point "Times New Roman" font may be represented with a light-blue color, a text feature with a 12-point italicized "Times New Roman" font may be represented with a pink color, and so forth. However, none of these representations of the digital document 122 include the content of the digital document 122, e.g., although colored blocks representing text features are incorporated into the stamp representation 126, the text features themselves are not incorporated into the stamp representation 126. In this way, the stamp representation 126 conveys a visual structure of the digital document 122 without violating the privacy of a user of the document processing application 120.

The context representation module 204 processes the digital document 122 to generate a privacy preserving representation of language features of the digital document 122 for use in generation of the stamp representation 126. The context representation module 204, for instance, may generate semantic representations of the content of the digital document 122 using a natural language processing model, such as a natural language processing model that utilizes word vectors or weighted tokens to process natural data for purposes of determining syntactic or semantic word similarities, automatic summarization, machine translation, sentiment analysis, and so forth.

In an example implementation of a natural language processing model utilizing word vectors, the natural language processing model is calibrated to a vector space of a word vector dictionary, such as by utilizing a neural network model that is built upon an underlying word vector dictionary. A word vector is a vector representation of a word that captures semantic meaning of the word. For example, a single word vector may include thousands or more dimensions, and include significantly more information than is included in the raw ASCII values corresponding to the word. A plurality of word vectors are mapped into a common vector space, and semantic or syntactic word similarities can be derived from insights exposed by the vector space. In this example, the context representation module 204 analyzes the digital document 122 using the natural language processing model to convert the words included in the digital document 122 into the vector space. Based on the location of words within the vector space (e.g., by identifying different clusters of words in the vector space), the context representation module 204 may identify a subset of topics that relate to the digital document 122.

In another example implementation, the context representation module 204 employs a natural language processing model utilizing weighted keywords. In this example, the natural language processing model performs tokenization on the digital document 122 (e.g., breaking text into individual words or tokens, de-compounding words, removing stop-words that do not have significance as a keyword, stemming words into a singular base or root form, and so forth) to generate a list of tokens and corresponding frequencies within the digital document 122. The context representation module 204 may use the generated tokens to extract an arbitrary number of topics (e.g., based on an arbitrary number of top keywords) that represent topics that relate to the digital document 122.

By extracting topics that relate to the digital document 122, the context representation module 204 generates semantic representations of the content of the digital document 122 that preserve the privacy of an owner of the digital document 122. For instance, the semantic representations of the content of the digital document 122 may include broad topics such as Sports, News, Technology, or Cars, may include an assumption as to the type of document such as a financial document, a scientific document, a business work product, a novel, or a slideshow, and may include any other semantic representation of content that generally portrays a topic relevant to the digital document 122 without including the content of the digital document 122.

The stamp representation module 108 may generate the stamp representation 126 in a variety of ways. In some implementations, the stamp representation module 108 generates the stamp representation 126 by utilizing the visual representation 202 alone, while in other implementations the stamp representation module 108 generates the stamp representation 126 by utilizing the context representation module 204 alone or in combination with the visual representation module 202. However, it is to be appreciated that the visual representation module 202 and the content representation module 204 are merely provided as examples, and the stamp representation module 108 may generate the stamp representation 126 without utilizing either the visual representation module 202 or the context representation module 204.

Figure 3:
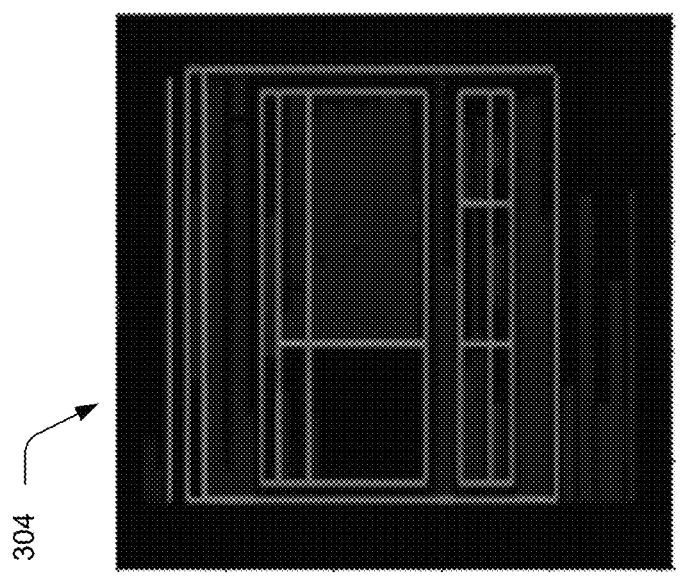
FIG. 3 depicts example stamp representations.
Figure 3:
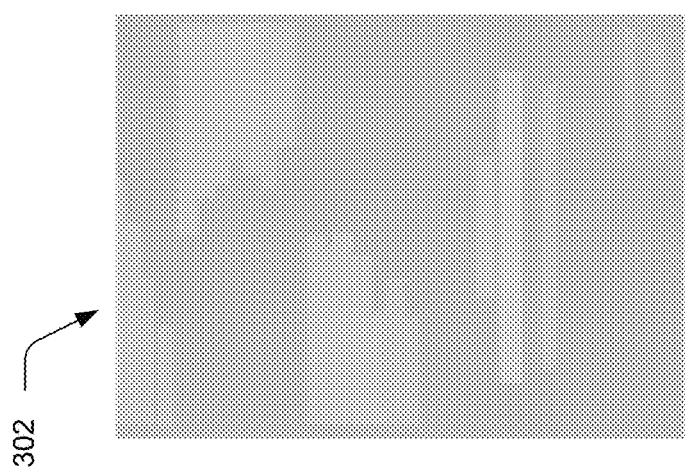
Figure 3:
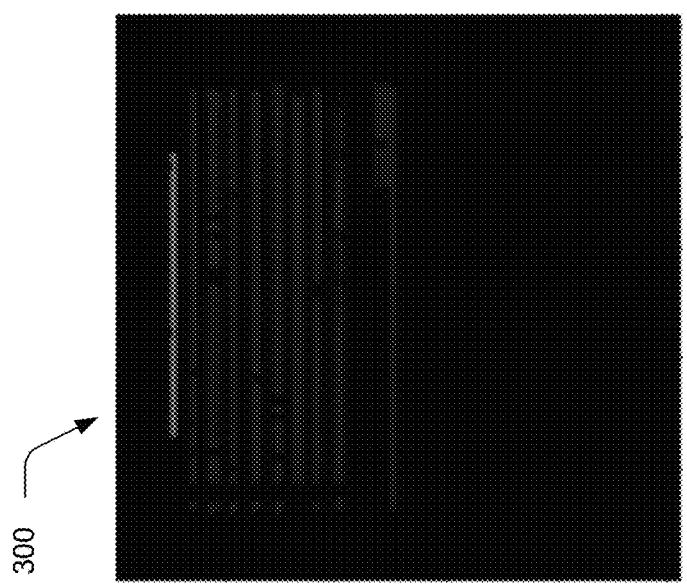

FIG. 3 depicts example stamp representations 300, 302, and 304. The stamp representation 300 includes representations of a plurality of text features indicated by a plurality of colored regions on a black background. Different font features are represented with different colors and/or intensities. For example, the stamp representation 300 includes a representation of a title or header portion that is represented with a color that is different and brighter than a representation of the body text of the document. The stamp representation 302 includes representations of a plurality of text features indicated by a plurality of colored regions on a different colored background. In this example, each text region is represented by a same color, however representations of text regions have an intensity or brightness that varies based on characteristics of the text features in a corresponding document. The stamp representation 304 includes representations of a plurality of text features and representations of other visual features of a corresponding document. In this example, the stamp representation 304 includes representations of text features that are colored blue on a black background, while structural visual features (e.g., cell borders of a table) are represented as red lines.

Figure 4:
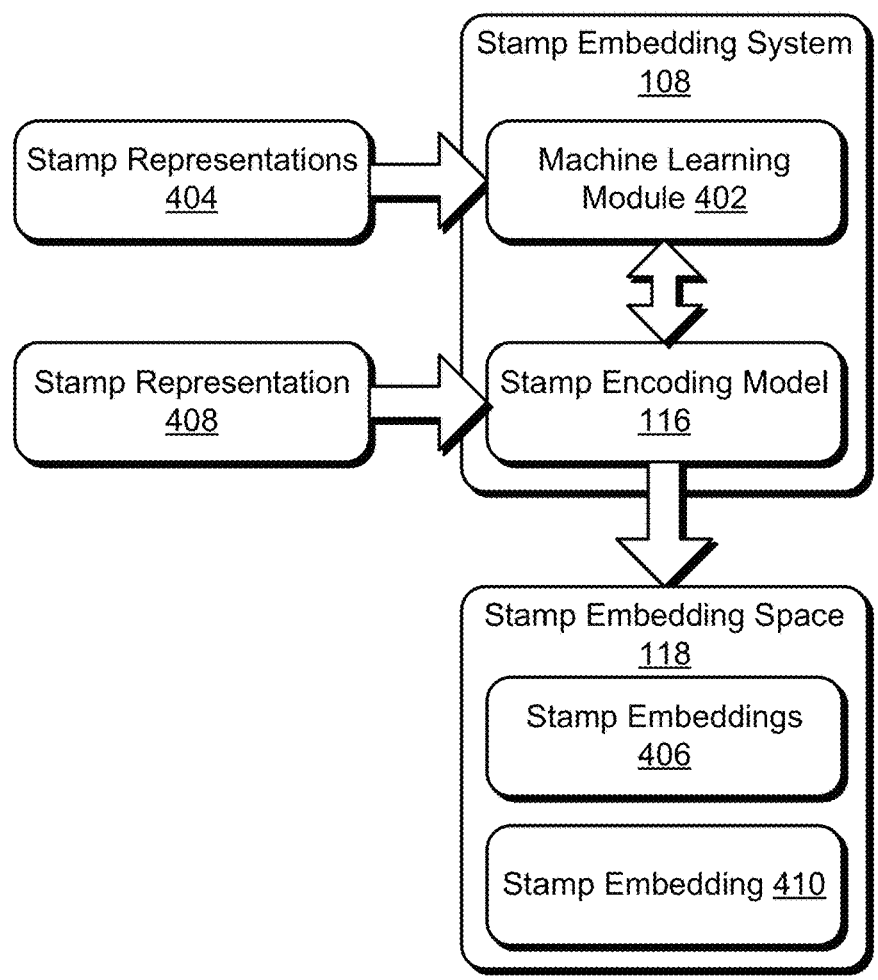
FIG. 4 depicts an example system showing a stamp embedding processing pipeline of the stamp embedding system of FIG. 1 in greater detail.

FIG. 4 depicts a system 400 showing an example stamp embedding processing pipeline of the stamp embedding system 108 of FIG. 1 in greater detail to create a stamp representation.

The stamp embedding system 108 employs a machine learning model 402 to create the stamp encoding model 116. To do so, the stamp embedding system 108 receives a plurality of stamp representations 404 and inputs the stamp representations 404 into the machine learning module 402. The machine learning module 402 can include supervised or unsupervised machine learning approaches to generate a stamp encoding model 116 that is a deep learning architecture.

In an example implementation, the machine learning module 402 utilizes a deep metric learning process to train a residual neural network. The machine learning module 402 receives triplets of training images from within the plurality of stamp representations 404, with each triplet including an example base image, an example image with a same class as the base image, and an example image with a different class than the base image. By analyzing features of the training data (e.g., the input triplets of stamp representations) at various levels of abstraction or depths within levels of the neural network, the stamp encoding model 116 outputs values associated with each of the input stamp representations. The machine learning module 402 employs a loss function calibrated to minimize the difference in output values between the base image and the example image with a same class, and to maximize the different in output values between the base image and the example image with a different class. The machine learning module 402 uses the loss function (e.g., uses the measure of loss resulting from the loss function) to train the stamp encoding model 116. In particular, the machine learning module 402 can use the loss function to modify one or more functions or parameters used to train the stamp encoding model 116 in order to minimize the loss (e.g., maximize the difference between inputs of a different class and minimize the difference between inputs of a same class). In this way, the machine learning module 402 may employ the loss function to learn the stamp encoding model 116 through processing of the stamp representations 404. Once trained, the stamp encoding model 116 may then be used to project a stamp representation into a stamp embedding space, or further trained such as to perform classifications, segmentations, predictions, and so forth.

As described above, the machine learning module 402 can train the stamp encoding model 116 using training data derived from the plurality of stamp representations 404. The machine learning module 402 can use any suitable machine learning techniques. According to various implementations, the machine learning module 402 uses supervised learning, unsupervised learning, or reinforcement learning. For example, the machine learning module 402 can include, but is not limited to, artificial neural networks (e.g., fully-connected neural networks, deep convolutional neural networks, recurrent neural networks, residual neural networks, and so forth). In any case, the machine learning module 402 uses machine learning techniques to continually train and update the stamp encoding model 116 to produce an accurate encoding given a subsequent observation (e.g., a subsequent stamp representation).

The trained stamp encoding model 116 indirectly defines the stamp embedding space 118, such that an output of the stamp encoding model 116 occupies a point within the stamp embedding space 118. The stamp embedding system 108 utilizes the stamp encoding model 116 to populate the stamp embedding space 118 with a plurality of stamp embeddings 406. In other words, the stamp encoding model 116 projects an input stamp representation into the stamp embedding space 118 as a stamp embedding. The stamp embedding system 108 beings by processing each of the stamp representations 404 with the stamp encoding model 116 to create the stamp embeddings 406. Each individual one of the stamp embeddings 406 may be represented by a plurality of dimensions or values, with the plurality of values indicating a location within the stamp embedding space 118. Stamp embeddings that are close to one another within the stamp embedding space 118 indicate that documents corresponding to the stamp embeddings include similar features.

Figure 5:
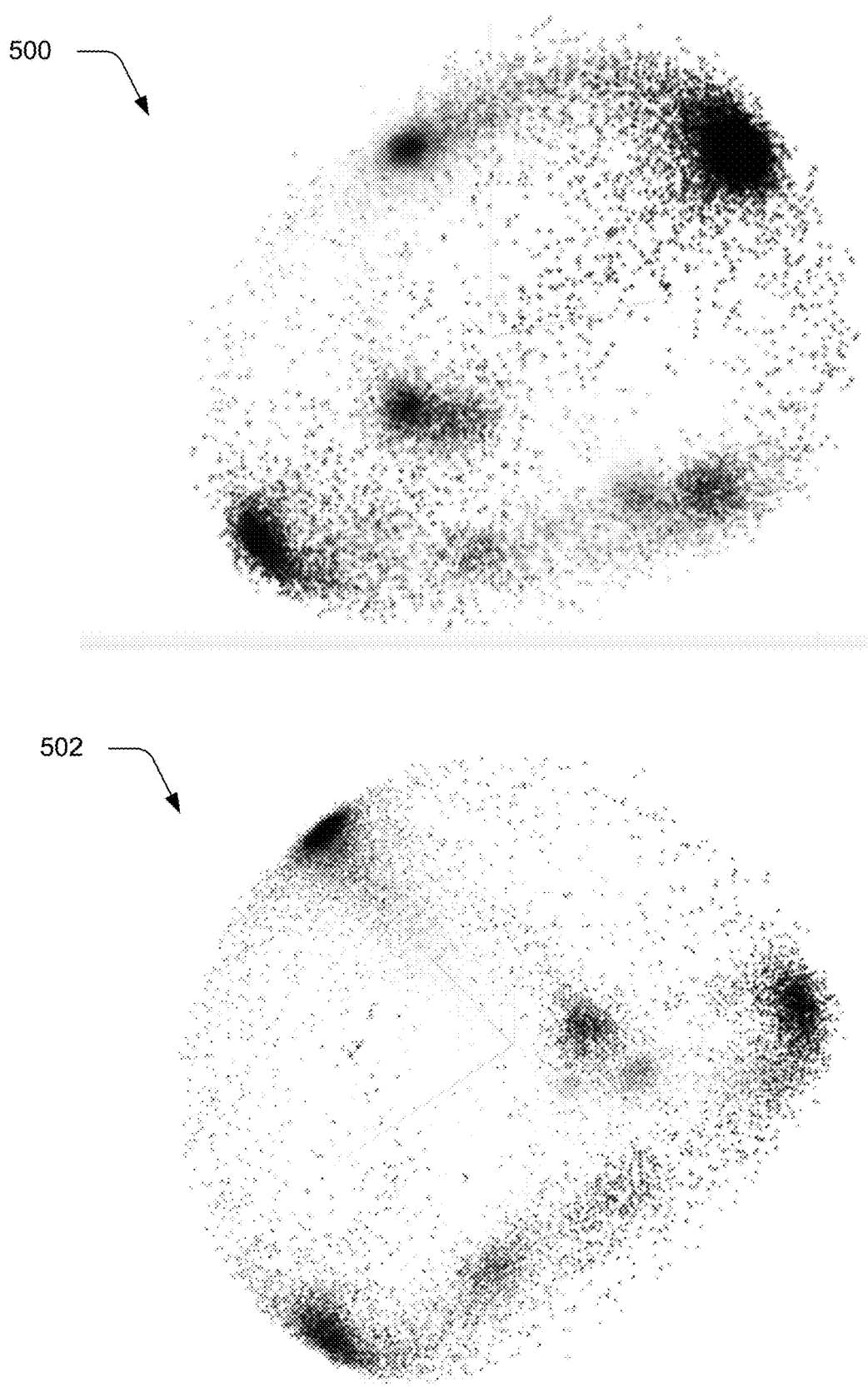
FIG. 5 depicts example stamp representations projected into example stamp embedding spaces.

FIG. 5 depicts example stamp representations projected into example stamp embedding spaces 500 and 502. In each of these examples, a plurality of stamp representations have been processed by the stamp encoding model 116 into stamp embeddings, and the stamp embeddings have been projected into the respective stamp embedding spaces 500 and 502. Although each respective stamp embedding may include hundreds of dimensions or values, the stamp embedding spaces 500 and 502 are represented with stamp embeddings plotted as points in three-dimensional space. As the stamp embeddings capture and exploit feature interactions and patterns from within the stamp representations, stamp embeddings corresponding to similar documents have similar locations within the respective stamp embedding spaces 500 and 502. As a result, the example stamp embedding spaces 500 and 502 each includes a plurality of clusters of stamp embeddings that each correspond to a different type of document. These clusters may be leveraged and utilized in a variety of manners, as further described with respect to FIGS. 6-10.

Returning to FIG. 4, the stamp embedding system 108 receives an additional stamp representation 408 (e.g., a stamp representation that is not included in the stamp representations 404 and was not used by the machine learning module 402 in training the stamp encoding model 116) and processes the additional stamp representation 408 with the stamp encoding model 116 to create a stamp embedding 410. In implementations, the digital analytics system 102 has access to origin documents corresponding to the stamp representations 404, but does not have access to an origin document corresponding to the stamp representation 408. The digital analytics system 102 derives insights into the origin document corresponding to the stamp representation 408 through a comparison of the stamp embedding 410 with the stamp embeddings 406, as described in further detail with respect to FIGS. 6-10.

Figure 6:
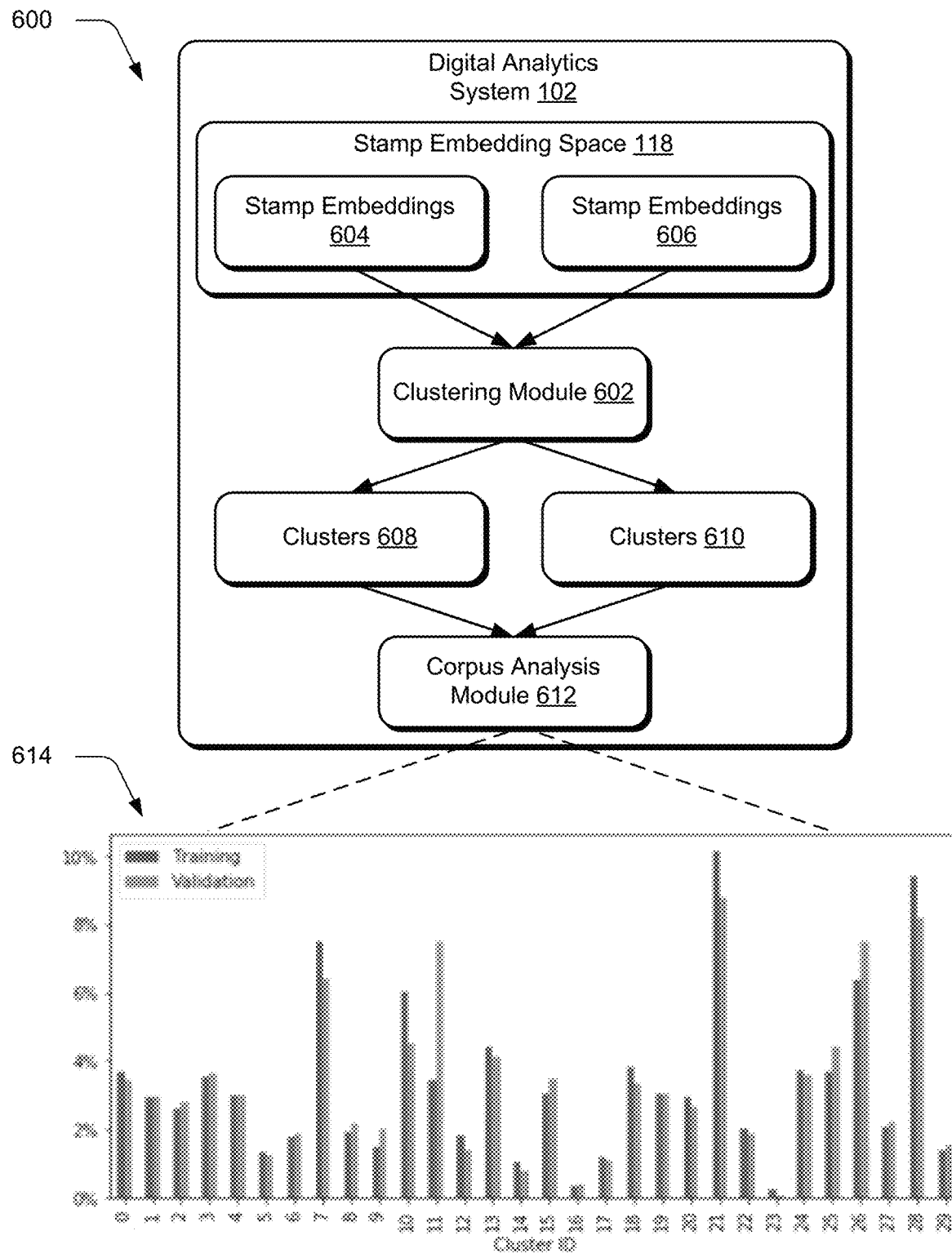
FIG. 6 depicts an example system operable to analyze and adjust the distribution of a document corpus based on analysis of a stamp embedding space.

FIG. 6 depicts an example implementation 600 of the digital analytics system 102 in which the stamp embedding space 118 is utilized to analyze and adjust the distribution of a document corpus.

The digital analytics system 102 includes a clustering module 602 configured to analyze stamp embeddings within the stamp embedding space 118 and generate a plurality of clusters describing the stamp embeddings. For instance, the stamp embedding space 118 includes stamp embeddings 604 and stamp embeddings 606 and in turn generates clusters 608 and 610, respectively. In implementations, the stamp embeddings 604 are derived from a document corpus for which the digital analytics system 102 has access to, while the stamp embeddings 606 are derived from source documents for which the digital analytics system 102 does not have access to, such as stamp embeddings collected from a plurality of client devices. The clustering module 602 begins by performing clustering techniques on the stamp embeddings 604 to generate the clusters 608. The clustering module 602 may utilize the identified clusters 608 when analyzing the stamp embeddings 606 (e.g., using the identified clusters 608 to define cluster spaces within the stamp embedding space 118 and identifying clusters in the stamp embeddings 606 based on inclusion in the cluster spaces), or may independently perform clustering techniques on the stamp embeddings 606.

In an example implementation, the clustering module 602 utilizes an unsupervised clustering technique that begins with the assignment of a plurality of random points, e.g., 40 random points. Each random point is considered a cluster, and the clustering module 602 identifies additional points that are closest to each cluster and merges the points into larger clusters. The clustering module 602 continues this process iteratively until all points have been merged into a cluster. In another example implementation, the clustering module 602 utilizes a hierarchical approach in which every data point begins in a single cluster, and an entropy algorithm is employed to determine data points that can be removed from the cluster to form a new cluster. It is to be appreciated that any suitable clustering technique may be used.

The clusters 608 include a plurality of clusters that each includes a plurality of the stamp embeddings 604. For example, the clusters 608 may include 30 different clusters, each of which including hundreds or thousands of stamp embeddings. Similarly, the clusters 610 include a plurality of clusters that each include a plurality of the stamp embeddings 606. In implementations, the clusters within the clusters 608 and 610, respectively, are defined to occupy similar or overlapping regions of the stamp embedding space 118 (e.g., a first cluster of the clusters 608 corresponds to a first cluster of the clusters 610 within the stamp embedding space 118) while containing separate stamp embeddings within the regions. This allows a corpus analysis module 612 of the digital analytics system 102 to analyze and compare the clusters 608 with the clusters 610. For instance, the corpus analysis module 612 analyzes the clusters 608 and 610 to identify a number of stamp embeddings included within each individual cluster. For example, the corpus analysis module 612 identifies a number of stamp embeddings 604 in a first cluster of the clusters 608 and a number of stamp embeddings 606 in a first cluster of the clusters 610.

An example comparison of the clusters 608 and 610 is provided in an example chart 614. In this example, the clusters 608 and 610 each include 30 different clusters (e.g., depicted as cluster ID's 0 through 29). The number of stamp embeddings in each cluster are represented with two bars. A first bar corresponds to the stamp embeddings 604 and the clusters 608 (e.g., depicted as "Training" data) while a second bar corresponds to the stamp embeddings 606 and the clusters 610 (e.g., depicted as "Validation" data). In this way, a user of the digital analytics system 102 may quickly identify a distribution of stamp embeddings among the 30 different clusters for each of the groups of stamp embeddings 604 and 606. It is to be appreciated that the bar graph 614 is provided merely as an example, and the corpus analysis module 612 may represent its analysis of the clusters 608 and 610 in any suitable manner and is not limited to a bar graph.

The digital analytics system 102 utilizes the results of the corpus analysis module 612 to adjust a document corpus (e.g., a collection of documents corresponding to either the stamp embeddings 604 or the stamp embeddings 606). In an example, the stamp embeddings 604 represent a document corpus that is owned or maintained by the provider of the digital analytics system 102, while the stamp embeddings 606 represent a collection of documents received from a plurality of client devices 104. The provider of the digital analytics system 102 seeks to align the cluster distribution of their document corpus with the cluster distribution of the stamp embeddings 606. By utilizing the corpus analysis module 612, the provider of the digital analytics system 102 may, for instance, identify that their document corpus includes too many documents in cluster 7 and not enough documents in cluster 11. Accordingly, the provider of the digital analytics system 102 alters their document corpus to include fewer documents corresponding to cluster 7 and more documents corresponding to cluster 11. In implementations, the corpus analysis module 612 identifies a document that does not belong to any identified cluster. The provider of the digital analytics system 102 may then identify characteristics of this out-of-distribution document and add new documents to the document corpus that include these characteristics, allowing the creation of a new cluster.

This provides a number of technical benefits to the provider of the digital analytics system 102. The document corpus, for instance, is utilized as training documents for a plurality of machine learning processes in a variety of fields, such as digital marketing, entity resolution, analysis of traffic patterns, natural language processing, image classification, and so forth. In each of these examples, the accuracy of the result of machine learning processes are limited to the accuracy of the input documents. If the input documents do not accurately represent the documents to which the machine learning results are ultimately applied, the overall accuracy and utility is decreased. Thus, digital analytics system 102 leverages the stamp embedding space 118 and the corpus analysis module 612 to improve the accuracy of machine learning processes that utilize the document corpus.

Figure 7:
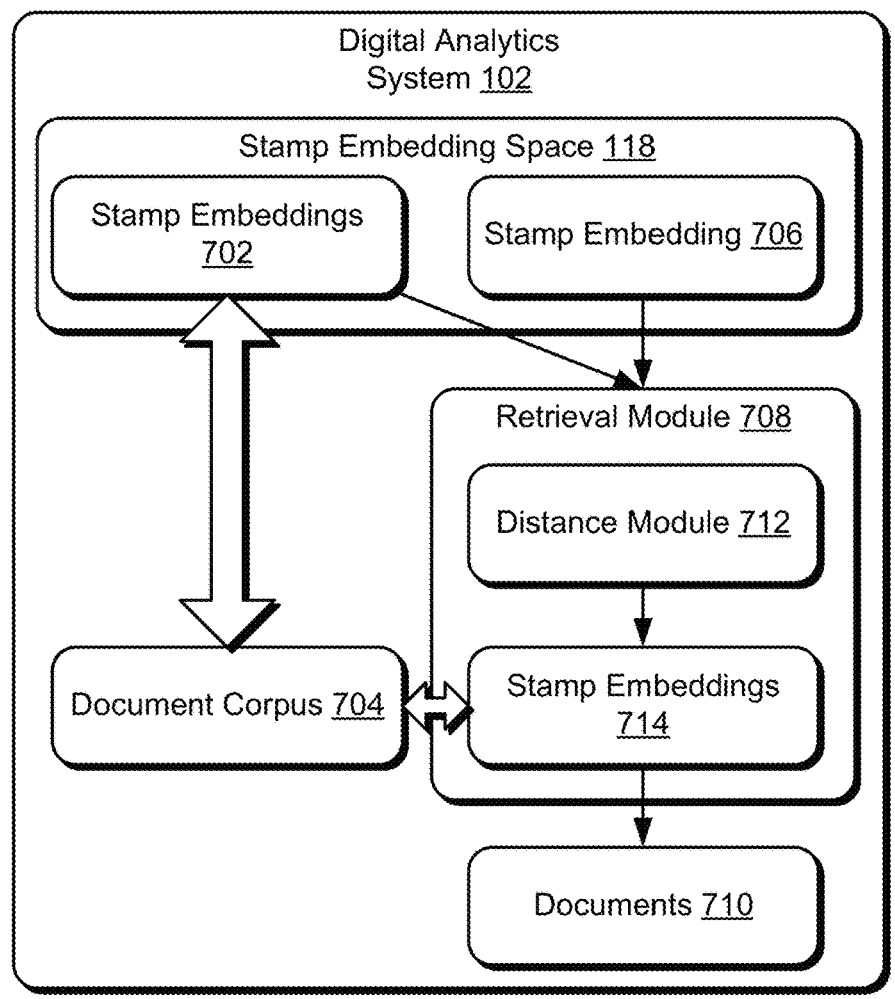
FIG. 7 depicts an example system operable to retrieve documents based on a stamp embedding.

FIG. 7 depicts an example implementation 700 of the digital analytics system 102 in which the stamp embedding space 118 is utilized to retrieve documents based on a stamp embedding.

The stamp embedding space 118 includes a plurality of stamp embeddings 702 corresponding to documents within a document corpus 704, and the digital analytics system 102 has access to both the stamp embeddings 702 and the source documents in the document corpus 704. The stamp embedding space further includes a stamp embedding 706, however the digital analytics system 102 does not have access to a source or origin document from which the stamp embedding 706 was created. For example, the digital analytics system 102 received the stamp embedding 706 (or a corresponding stamp representation) from a client device 104, but did not receive a corresponding digital document.

The digital analytics system 102 utilizes a retrieval module 708 to retrieve documents 710 from the document corpus 704 that have similar features as the source document of the stamp embedding 706. To do so, retrieval module 708 utilizes a distance module 712 to analyze the stamp embedding space 118 and identify a plurality of stamp embeddings 714 (e.g., from within the stamp embeddings 702) based on respective distances to the stamp embedding 706. For example, the distance module 712 may analyze the stamp embedding space 118 to identify stamp embeddings 714 that are within a threshold distance from the stamp embedding 706, may identify a set number of stamp embeddings 714 that are closest to the stamp embedding 706 (e.g., 1, 10, or 50 closest stamp embeddings, and so forth.), may identify stamp embeddings 714 that are assigned to a same cluster as the stamp embedding 706, and so forth.

The retrieval module 708 uses the stamp embeddings 714 to locate corresponding documents 710 within the document corpus 704. The documents 710 are then, for instance, output to a user. Based on the similarities between the stamp embedding 706 and the stamp embeddings 714, the documents 710 share characteristics with a source document corresponding to the stamp embedding 706. In this way, the documents 710 may provide insight into the characteristics of the origin document without having access to the origin document, thus protecting the privacy of a user associated with the origin document while giving a provider of the digital analytics system 102 insight into the characteristics of the origin document. A further example of the digital analytics system 102 and the retrieval module 708 is provided with respect to FIG. 8.

Figure 8:
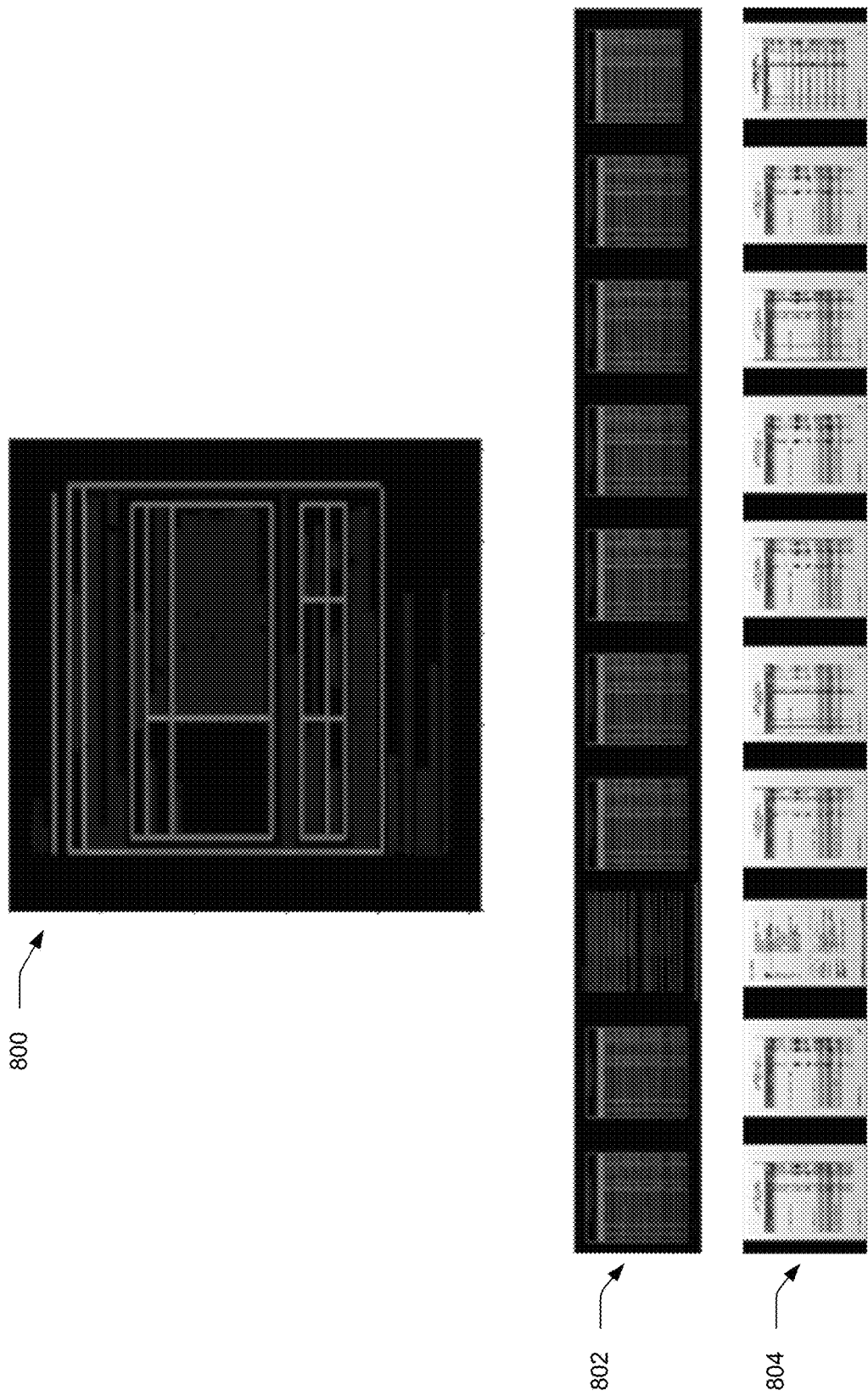
FIG. 8 depicts an example input and output of the retrieval module of FIG. 7.

FIG. 8 depicts an example input and output of the retrieval module 708 as described with respect to FIG. 7. A stamp representation 800 is input to the retrieval module 708. The distance module 712 analyzes the stamp embedding space to locate a plurality of stamp embeddings 714 that are similar to the stamp representation 800. The stamp embeddings 714 correspond to stamp representations 802, and the stamp representations 802 are output to a user of the digital analytics system. The retrieval module then locates within the document corpus 704 digital documents 804 corresponding to the stamp embeddings 714 and the stamp representations 802. The digital documents 804 are output to the user of the digital analytics system.

In this way, a user can access documents based on the stamp representation 800 despite not having access to a source document corresponding to the stamp representation 800. For instance, the stamp representation 800 was collected from a client device in a privacy preserving manner.

By accessing the digital documents 804, a user of the retrieval module 708 gains insight into the structure or format of the source document corresponding to the stamp representation 800. As an example, each of the digital documents 804 is a resume and the user infers that the source document corresponding to the stamp representation 800 is also a resume.

Figure 9:
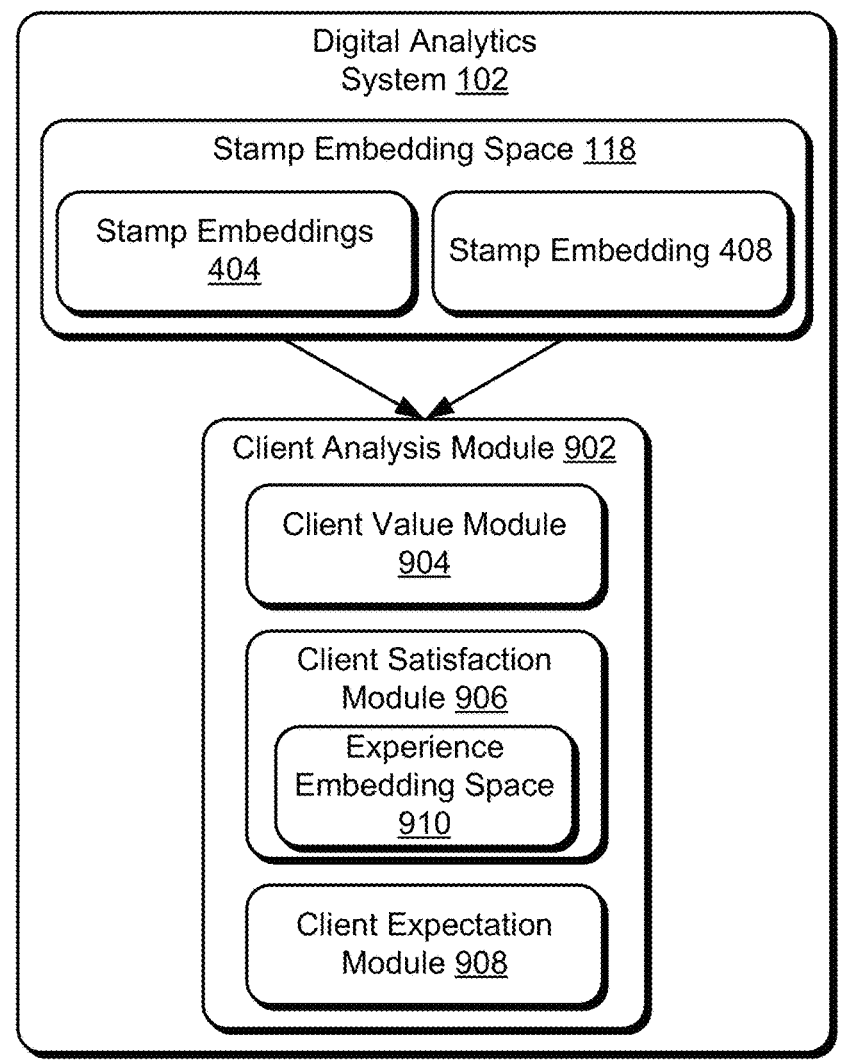
FIG. 9 depicts an example system showing a stamp embedding space operable to generate predictions pertaining to a client.

FIG. 9 depicts an example implementation 900 of the digital analytics system 102 in which the stamp embedding space 118 is utilized to generate predictions pertaining to a client, such as a user of the client device 104. To do so, the digital analytics system 102 employs a client analysis module 902.

The client analysis module includes a client value module 904, a client satisfaction module 906, and a client expectation module 908. Each of the client value module 904, the client satisfaction module 906, and the client expectation module 908 analyzes a stamp embedding received from a client device (e.g., the stamp embedding 408 of FIG. 4) with respect to a plurality of stamp embeddings derived from a document corpus (e.g., the stamp embeddings 404 of FIG. 4) in order to generate a prediction pertaining to the client device.

The client value module 904 analyzes the stamp embedding space 118 to determine a lifetime value of a customer, e.g., a user of the document processing application 120. This may include, for instance, generating a probability that the customer will be retained as a customer. To do so, the client value module 904 uses the stamp embedding 408 (or a plurality of stamp embeddings received from the client device 104) to determine a cluster in which the customer's digital documents typically resides. The client value module 904 tracks clusters associated with the customer over time, such as to visualize how the customer's needs progress over time. The digital analytics system 102 utilizes insights derived from the client value module 904 to perform customer retention actions. For example, the client value module 904 determines that there is a low likelihood of retaining the customer, and that the customer primarily opens digital documents that are scientific documents. The digital analytics system 102 leverages these insights to provide the customer with an offer pertaining to scientific documents.

The client satisfaction module 906 analyzes the stamp embedding space 118 to predict whether a customer is likely to have a good or a bad experience, e.g., with the document processing application 120. In implementations, the client satisfaction module 906 employs a stamp embedding space that is configured differently than the stamp embedding space 118. In an example, the client satisfaction module 906 includes an experience embedding space 910 that defines similarity of documents based on user experience. In this way, the stamp embedding 408 as projected into the experience embedding space 910 indicates whether the customer will be happy or unhappy with their experience using the document processing application. This determination allows the digital analytics system 102 to perform additional actions with respect to the customer, e.g., to send a customer service survey, provide a product discount, suggest alternative applications, and so forth.

The client expectation module 908 analyzes the stamp embedding space to track the distribution of stamp representations received from client devices over time. By tracking user collected postage stamps, an understanding may be gained as to how the general consumer base expects the document processing application 120 to evolve over time, and can be used to drive the direction of future development of the document processing application 120 as well as direct marketing activities pertaining to the document processing application 120. As an example, a provider of the document processing application can target for development features that pertain to document types identified by the client expectation module 908 as having an increased interest from the general consumer base, reprioritize a backlog of bug reports based on the identified document types, and so forth.

Figure 10:
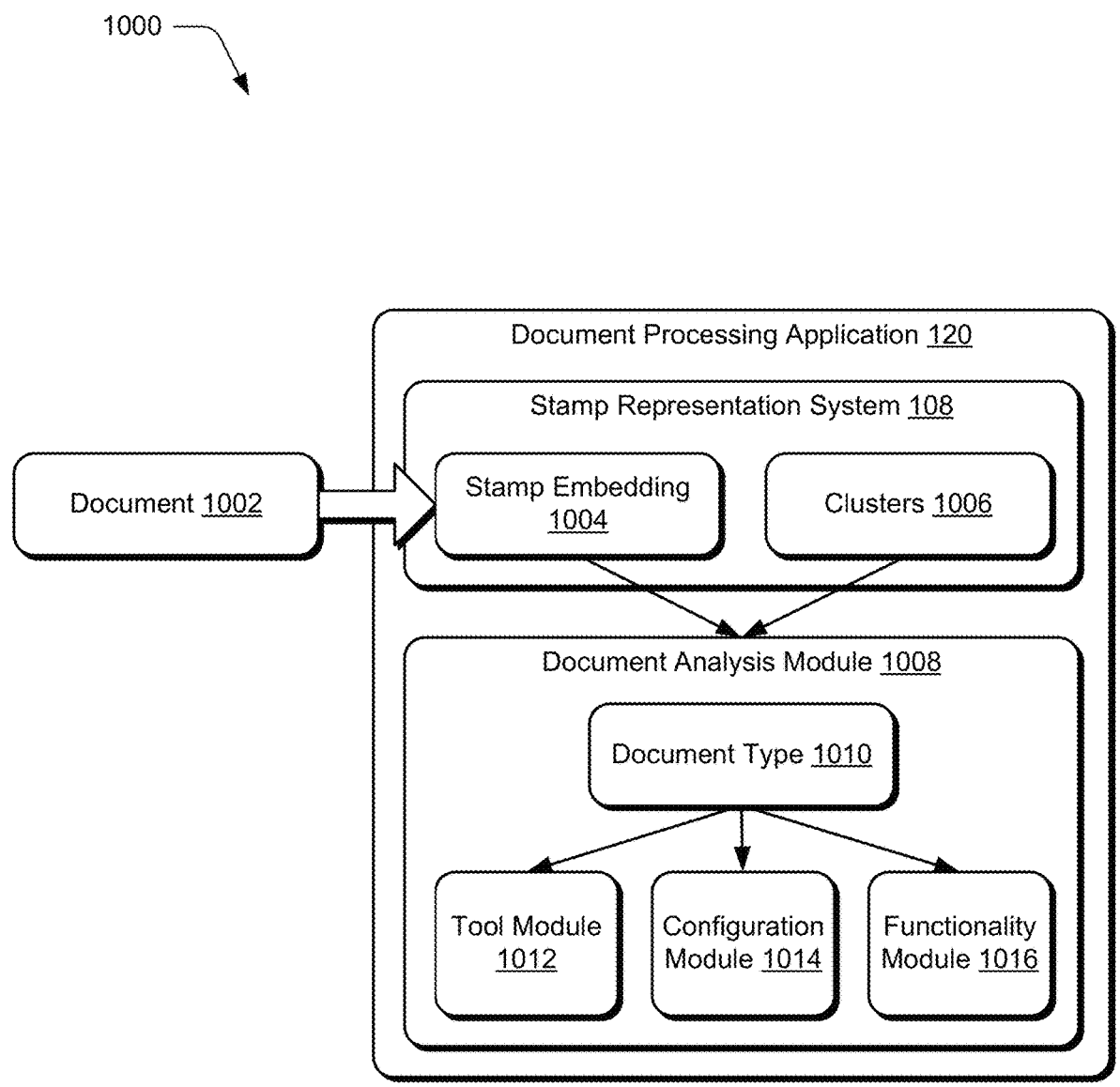
FIG. 10 depicts an example system showing a stamp embedding space operable to enhance functionality of a document processing application.

FIG. 10 depicts an example implementation 1000 of the document processing application 120 in which the stamp representation system 108 is utilized to enhance functionality when processing a document 1002.

When the document processing application 120 accesses a document 1002, e.g., for viewing the document 1002, the document processing application employs the stamp representation system 108 to generate a stamp embedding 1004 corresponding to the document 1002. In some implementations, the stamp representation system 108 on the client device 104 may include the stamp encoding model 116, such that the stamp representation system 108 generates a stamp representation for the document 1002 and processes the stamp representation with the stamp encoding model 116 to generate the stamp embedding 1004. Further, the stamp representation system 108 on the client device 104 may include clusters 1006, e.g., corresponding to the clusters 608 or 610 generated according to the implementations described with respect to FIG. 6.

A document analysis module 1008 of the document processing application 120 utilizes the stamp embedding 1004 to identify a document type 1010 of the document 1002. In implementations, this involves locating a cluster within the clusters 1006 that is most similar to the stamp embedding 1004 (e.g., a cluster with a centroid with a closest distance to the stamp embedding 1004). In such an implementation, each of the clusters 1006 is assigned a document type, and thus the stamp embedding 1004 is assigned the document type 1010 based on a corresponding document type of the located cluster. The document processing application 120 may leverage the document type 1010 in a variety of ways, including use of a tool module 1012, a configuration module 1014, and/or a functionality module 1016.

The tool module 1012 suggests a tool to a user when they open a document, based on the document type 1010. This may include, for instance, altering a user interface of the client device 104 to display or emphasize an interactive mechanism that allows a user of the document processing application 120 to utilize the tool. The document processing application 120 incorporates a plurality of tools, and each of the tools may be associated with particular document types. In some cases, a tool is designed and included in the document processing application 120 specifically for use with a particular document type. In other cases, a tool is designed without a particular document type in mind, yet collected usage data from consumers indicate that consumers typically use the tool with a particular document type. In either case, the tool module 1012 locates at least one tool associated with the document type 1010 and presents the tool in a user interface of the document processing application 120. As an example, the document processing application 120 includes a tool for inserting equations into the document, and this tool is associated with a document type of scientific papers. In this example, the tool module 1012 identifies the document type 1010 as a scientific paper and configures the user interface to display the tool for inserting equations.

The configuration module 1014 selects a system configuration that provides a best experience for the particular document type 1010. For instance, the document processing application 120 may include a plurality of different modules of code configured to convert data included in document into a visual formal for display. For instance, different modules of code are optimized for displaying different respective types of documents. As an example, the document processing application 120 includes a first configuration (e.g., module of code) that is optimized for viewing slideshows, a second configuration that is optimized for viewing scientific papers, a third configuration that is optimized for viewing images, a fourth configuration that is optimized for financial documents, and so forth. The document processing application 120 selects a module of code corresponding to the identified document type 1010, thus providing an optimal experience as compared to using a generic configuration.

The functionality module 1016 disables functionality of the document processing application 120 based on the particular document type 1010. Various functionality of the document processing application 120 is developed for use with particular document types, but may cause errors or unintended artifacts when utilized with unanticipated document types. As an example, the document processing application includes a module of code that formats multi-column text in vector format PDF document. However, this example module of code produces inconsistent results and incorrectly formats multi-column texts of a particular document type. For example, the module of code misidentifies three columns of text in a scientific paper as being two columns of text, and a displayed page using this module of code has overlapping text in only two displayed columns. In this example, the functionality module 1016 identifies that the particular document type 1010 is a scientific paper and accordingly disables the module of code that formats multi-column text. Instead, the document processing application 120 may utilize a different module of code, such as to display a raster format PDF document instead of a vector format PDF document.

Although generally described in terms of full documents, it is to be appreciated that the techniques described herein may operate in a similar manner on other scales or granularity, e.g., on a page by page basis, a column by column basis, and so forth. For example, a document type may be individually determined for each page of a document, and the tool module 1012, the configuration module 1014, and the functionality module 1016 may each differently for each page of the document.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-10.

Figure 11:
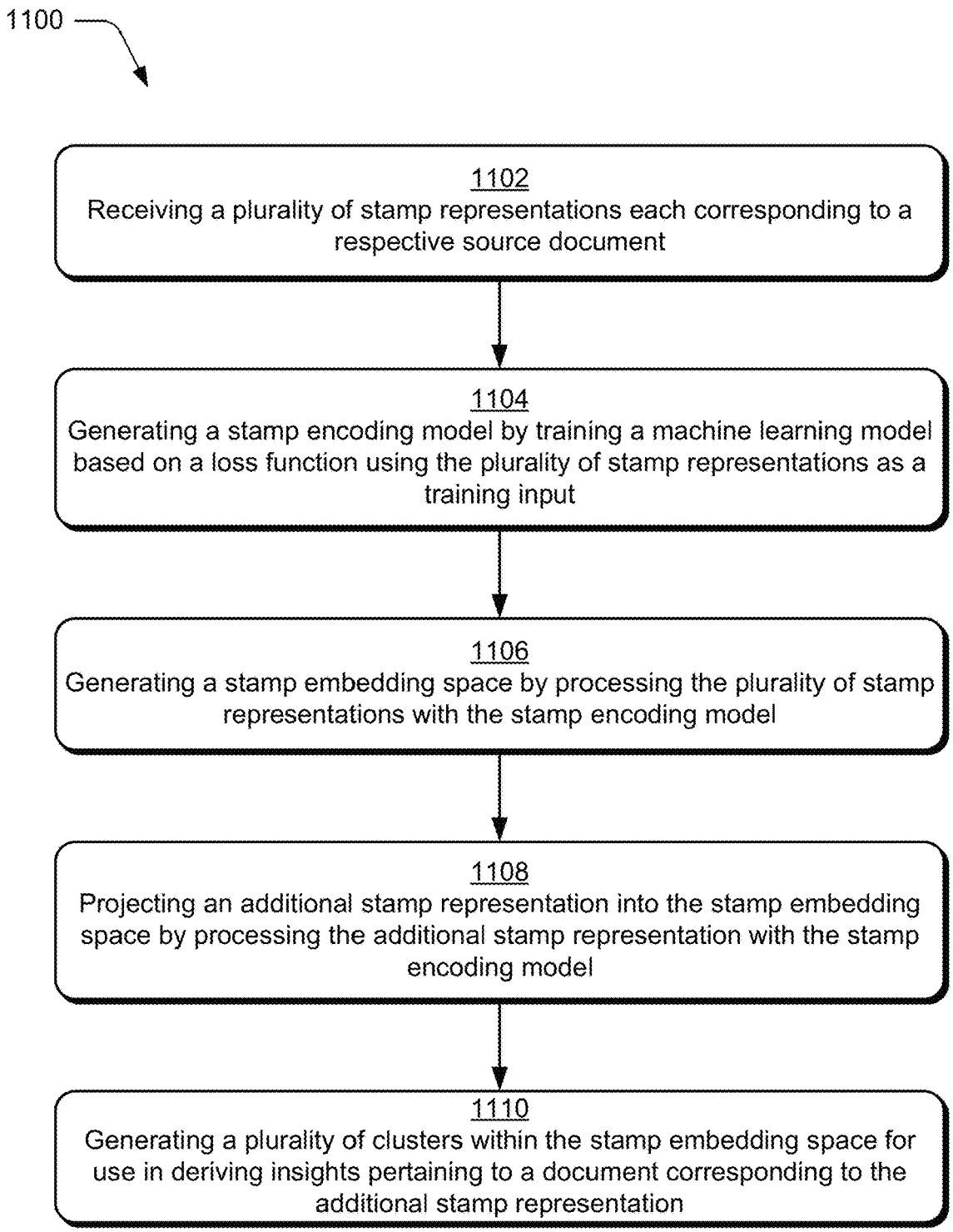
FIG. 11 is a flow diagram depicting a procedure in an example implementation of privacy preserving document analysis techniques.

FIG. 11 depicts a procedure 1100 in an example implementation of privacy preserving document analysis techniques. A plurality of stamp representations are received that each correspond to a respective source document (block 1102). In implementations, the stamp representations are generated by a stamp representation system of a digital analytics system, such as that described with respect to FIG. 2. A plurality of source documents corresponding to the plurality of stamp representations are optionally received along with the plurality of stamp representations, and are part of a document corpus for which a provider of the digital analytics system has rights to use.

A stamp encoding model is generated by training a machine learning model based on a loss function using the plurality of stamp representations as a training input (block 1104). In implementations, the stamp encoding model is created from a residual neural network trained using a deep learning architecture (e.g., a deep metric learning process), such as described with respect to FIG. 4. The deep metric learning process trains a machine learning model with a loss function that modifies functions or parameters used to train the stamp encoding model by minimizing the difference between inputs of a same class and maximizing the difference between inputs of different classes.

A stamp embedding space is generated by processing the plurality of stamp representations with the stamp encoding model (block 1106). The stamp encoding model projects each respective stamp representation into a stamp embedding space as a stamp embedding. Each respective stamp embedding includes a plurality of dimensions or values, and the plurality of values indicates a location within the stamp embedding space. Although each respective stamp embedding may include hundreds of dimensions or values, the stamp embedding space may be represented as a three-dimensional space. As the stamp embeddings capture and exploit feature interactions and patterns from within the stamp representations, stamp embeddings with similar locations in the stamp embedding space correspond to source documents that have similar features.

An additional stamp representation is projected into the stamp embedding space by processing the additional stamp representation with the stamp encoding model (block 1108). In implementations, the additional stamp representation is received via a network from another device, e.g. a client device, and the digital analytics system does not possess rights to use or possess a source document corresponding to the additional stamp representation.

A plurality of clusters within the stamp embedding space are generated for use in deriving insights pertaining to a document corresponding to the additional stamp representation (block 1110). In an example, the plurality of stamp representations are associated with a document corpus, and the digital analytics system adjusts the documents included in the corpus based on the plurality of clusters as described with respect to FIG. 6. The adjusting may include, for instance, identifying an out-of-distribution document of a type and adding at least one document of the type to the document corpus. In another example, the digital analytics system retrieves a stamp representation from the plurality of stamp representations based on a similarity in the stamp embedding space (e.g., based on an association with a cluster of the plurality of clusters) to the additional stamp representation. The digital analytics system also retrieves a source document corresponding to the retrieved stamp representation (e.g., a source document that is in a same cluster as the retrieved stamp representation) and outputs the source document for display in a use interface, such as described with respect to FIGS. 7 and 8. In a further example, the digital analytics system may utilize the plurality of clusters to determine a probability of retention of a customer, predict a user satisfaction, determine expectations of a user, and so forth as described with respect to FIG. 9.

Figure 12:
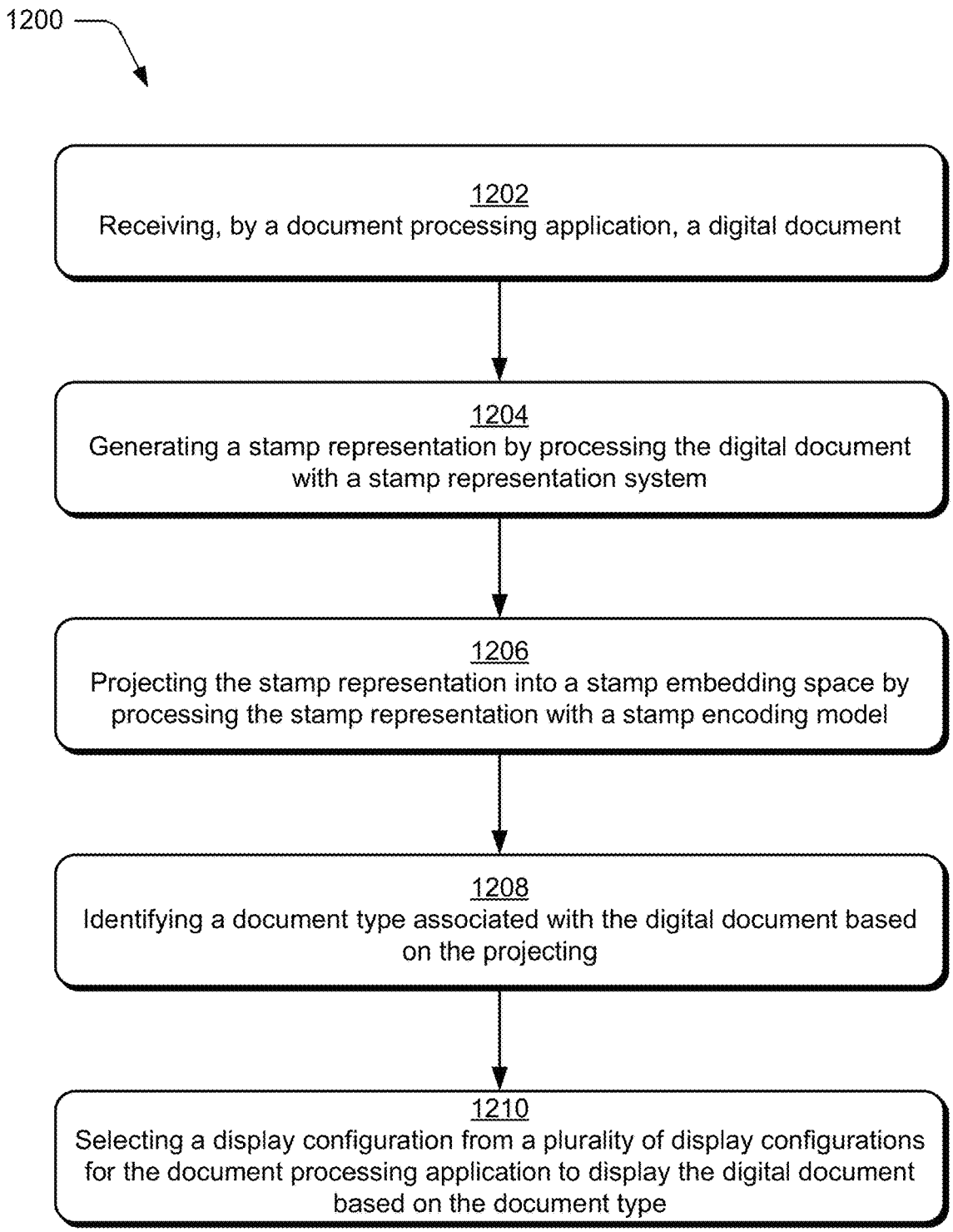
FIG. 12 is a flow diagram depicting a procedure in an example implementation of privacy preserving document analysis techniques.

FIG. 12 depicts a procedure 1200 in an example implementation of privacy preserving document analysis techniques. A digital document is received by a document processing application (block 1202). For instance, the document processing application 120 of FIG. 1 receives the digital document 122 as part of operations to access the digital document 122.

A stamp representation is generated by processing the digital document with a stamp representation system (block 1204). The stamp representation system may be, for instance, the stamp representation system 108 as described with respect to FIGS. 1 and 2, and is configured to process a digital document to generate a privacy preserving representation of features and/or context of the digital document. The stamp representation system parses data contained in a file of the digital document and visualizes the data to capture visual features and represent the visual features without including the content of the digital document.

The stamp representation is projected into a stamp embedding space by processing the stamp representation with a stamp encoding model (block 1206). In implementations, the stamp encoding model is generated by a digital analytics system, and once trained is communicated via a network to the client device. The document processing application of the client device utilizes the stamp encoding model to further process the stamp representation corresponding to the digital document. As the client device receives a trained stamp encoding model, the client device may benefit from the machine learning techniques without itself performing the machine learning techniques, thus preserving resources and allowing the client device to quickly and easily project the stamp representation into the stamp embedding space.

A document type is identified that is associated with the digital document based on the projecting (block 1208). For instance, various regions of the stamp embedding space may be associated with different document types, e.g., based on locations of clusters such as described with respect to FIG. 6. Based on the projection of the stamp representation into the stamp embedding space, a region containing the projection is identified and the document type corresponding to the region is associated with the digital document. Alternatively, the client device has access to the clusters determined by the digital analytics system, and performs a search to locate a nearest cluster to the projection. In this implementation, a document type corresponding to the identified cluster is associated with the digital document.

A display configuration is selected from a plurality of display configurations for the document processing application to display the digital document based on the document type (block 1210), such as described with respect to FIG. 10. In an example, the selected display configuration includes presentation of tools for the document type in a user interface of the document processing application, and displaying the tools on a display device. In another example, the selected display configuration includes disabling display functionality of the document processing application, and displaying the digital document without utilized the disabled display functionality. In yet another example, the selected display configuration includes a module of code optimized for converting data of documents of the document type into a visual format for display, and displaying the digital document using the module of code.

Having discussed some example procedures, consider now a discussion of an example system and device in accordance with one or more implementations.

Example System and Device

Figure 13:
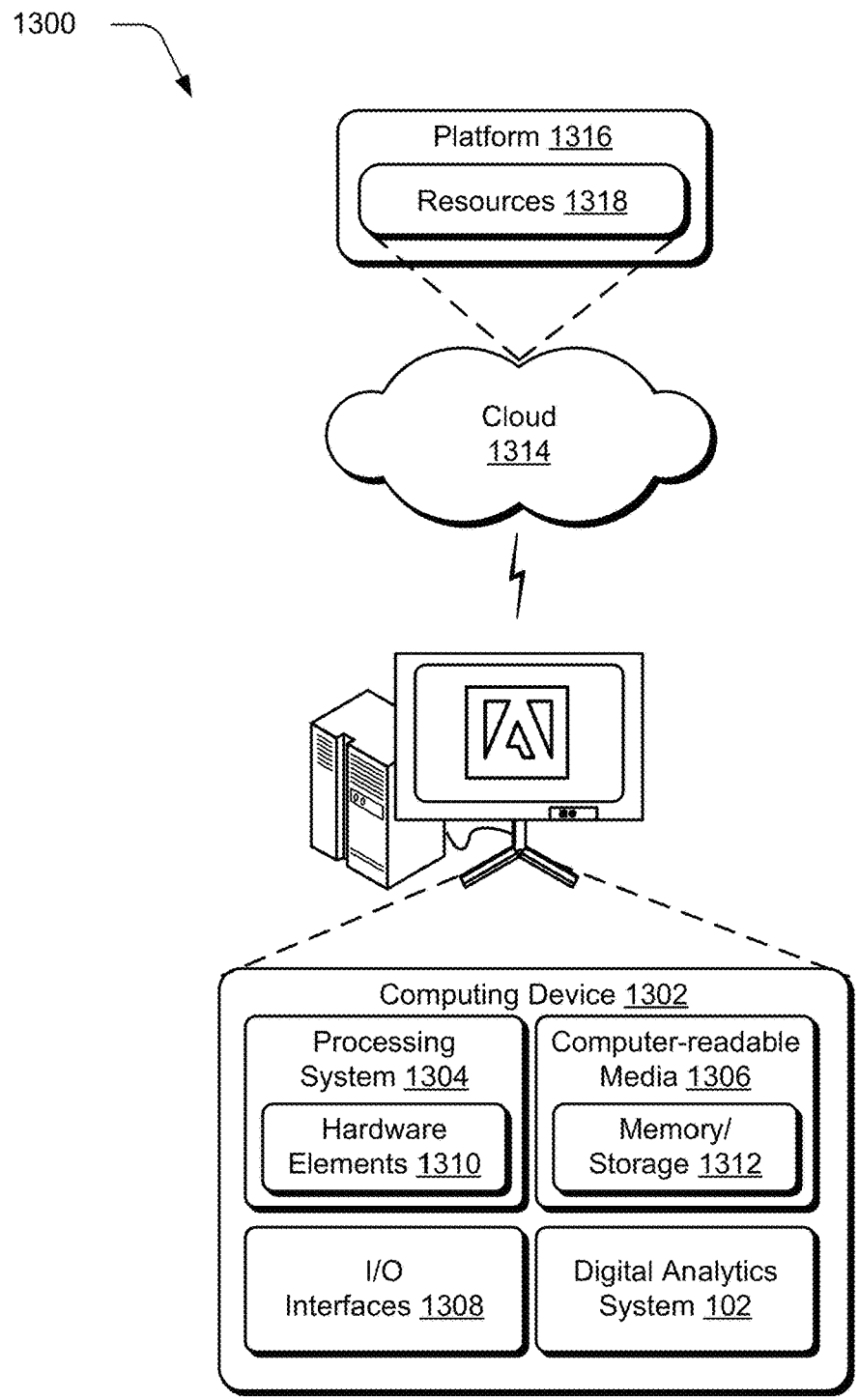
FIG. 13 illustrates an example system including various components of an example device that can be implemented as any type of computing device as described and/or utilized with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the digital analytics system 102. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, by a processing device, a plurality of stamp representations each corresponding to a respective source document and representing visual features of content of the respective source document without containing the content of the respective source document;

generating, by the processing device and using a machine learning model, a stamp embedding space by processing the plurality of stamp representations;

receiving, by the processing device, an additional stamp representation corresponding to an additional document and having features identifying a type of the additional document; and identifying, by the processing device, an insight pertaining to the additional document, including the type of the additional document, by comparing the additional stamp representation to the stamp embedding space.

2. The method of claim 1, wherein receiving the plurality of stamp representations includes processing each respective source document with a stamp representation system to extract the visual features and generate a respective corresponding stamp representation that represents the visual features with colors.

3. The method of claim 2, wherein characteristics of a particular visual feature are represented by an intensity or brightness of a color representing the particular visual feature.

4. The method of claim 3, wherein the particular visual feature is a text feature, and the characteristics of the particular visual feature include at least one of a font type, a font size, a font color, a font weight, and a typographical emphasis.

5. The method of claim 2, wherein the visual features include at least one of text features, bounding boxes, images, formulas, tables, charts, graphs, headers, or footers.

6. The method of claim 1, wherein the stamp embedding space defines a three-dimensional space and locations within the stamp embedding space are representative of document features.

7. The method of claim 1, further comprising projecting the additional stamp representation into the stamp embedding space by processing the additional stamp representation with the machine learning model to create an additional stamp embedding.

8. The method of claim 1, further comprising generating training data including a plurality of triplets of stamp representations, each respective triplet including a first stamp representation of a class, a second stamp representation of the class, and a third stamp representation of a different class.

9. The method of claim 8, further comprising training the machine learning model based on a loss function using the plurality of triplets of the training data as a training input, the loss function configured to minimize a difference in output between the first stamp representation of the class and the second stamp representation of the class and to maximize a difference in output between the first stamp representation of the class and the third stamp representation of the class.

10. The method of claim 1, further comprising identifying patterns in the plurality of stamp representations and identifying the insight pertaining to the additional document based on the patterns.

11. A system comprising:
a memory component; and
a processing device coupled to the memory component, the processing device to perform operations comprising:
receiving a plurality of stamp representations each corresponding to a respective source document and representing visual features of content of the respective source document without containing the content of the respective source document, the visual features identifying a type of the respective source document;

generating training data including a plurality of triplets of stamp representations; and training a machine learning model based on a loss function using the plurality of triplets of the training data as a training input, to generate a stamp encoding model that identifies an insight pertaining to the respective source document, including the type of the respective source document.

12. The system of claim 11, further comprising generating a stamp embedding space by processing the plurality of stamp representations with the stamp encoding model, the stamp embedding space for deriving insights pertaining to a document corresponding to an additional stamp representation.

13. The system of claim 12, wherein the receiving the plurality of stamp representations includes processing each respective source document with a stamp representation system to extract the visual features and generate a respective corresponding stamp representation that represents the visual features with colors.

14. The system of claim 13, wherein characteristics of a particular visual feature are represented by an intensity or brightness of a color representing the particular visual feature.

15. The system of claim 14, wherein the particular visual feature is a text feature, and the characteristics of the particular visual feature include at least one of a font type, a font size, a font color, a font weight, and a typographical emphasis.

16. The system of claim 13, wherein the visual features include at least one of text features, bounding boxes, images, formulas, tables, charts, graphs, headers, and footers.

17. A non-transitory computer-readable storage medium storing executable instructions, which when executed by a processing device, cause the processing device to perform operations comprising:

receiving a plurality of stamp representations each corresponding to a respective source document and representing visual features of content of the respective source document without containing the content of the respective source document;

generating, using a machine learning model, a stamp embedding space by processing the plurality of stamp representations;

receiving an additional stamp representation corresponding to an additional document and having features identifying a type of the additional document; and identifying an insight pertaining to the additional document, including the type of the additional document, by comparing the additional stamp representation to the stamp embedding space.

18. The non-transitory computer-readable storage medium of claim 17, wherein receiving the plurality of stamp representations includes processing each respective source document with a stamp representation system to extract the visual features and generate a respective corresponding stamp representation that represents the visual features with colors.

19. The non-transitory computer-readable storage medium of claim 18, wherein characteristics of a particular visual feature are represented by an intensity or brightness of a color representing the particular visual feature.

20. The non-transitory computer-readable storage medium of claim 17, wherein the stamp embedding space defines a three-dimensional space and locations within the stamp embedding space are representative of document features.

* * * * *